United States Patent
Schoendienst et al.

(10) Patent No.: US 7,051,870 B2
(45) Date of Patent: May 30, 2006

(54) SUSPENSION TRACK BELT

(75) Inventors: Rudolph Schoendienst, Brick, NJ (US); Willi Fuelleman, Freehold, NJ (US); Jeffrey C. Hudgens, San Francisco, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 10/722,775

(22) Filed: Nov. 26, 2003

(65) Prior Publication Data

US 2005/0109586 A1 May 26, 2005

(51) Int. Cl.
*B65G 17/06* (2006.01)

(52) U.S. Cl. .................... 198/850; 198/801
(58) Field of Classification Search ........... 198/850, 198/831, 793, 801
See application file for complete search history.

(56) References Cited

U.S. PATENT DOCUMENTS

| | | | |
|---|---|---|---|
| 2,157,283 A | 5/1939 | Dyson | |
| 2,268,542 A * | 1/1942 | Bergmann | 198/850 |
| 2,689,638 A | 9/1954 | Mojonnier | |
| 3,664,491 A | 5/1972 | Scanlon et al. | |
| 3,682,295 A | 8/1972 | Roinestad | |
| 3,730,331 A | 5/1973 | Goldberg | |
| 3,737,024 A | 6/1973 | Gelzer | |
| 3,788,455 A * | 1/1974 | Dieckmann, Jr. | 198/831 |
| 3,865,229 A | 2/1975 | Velander | |
| 3,967,721 A * | 7/1976 | Rhoden | 198/835 |
| 4,084,687 A | 4/1978 | Lapeyre | |
| 4,394,901 A | 7/1983 | Roinestad | |
| 4,711,346 A | 12/1987 | Breher et al. | |
| 5,303,818 A | 4/1994 | Gruettner et al. | |
| 5,339,938 A * | 8/1994 | Patin | 198/334 |
| 5,377,819 A | 1/1995 | Horton et al. | |
| 5,549,195 A | 8/1996 | Aulagner et al. | |
| 5,573,106 A | 11/1996 | Stebnicki | |
| 5,996,776 A | 12/1999 | van Zijderveld | |
| 6,607,073 B1 | 8/2003 | Büchi et al. | |
| 2003/0173191 A1 | 9/2003 | Hammock et al. | |

* cited by examiner

*Primary Examiner*—Gene O. Crawford
*Assistant Examiner*—Mark A. Deuble
(74) *Attorney, Agent, or Firm*—Lerner, David, Littenberg, Krumholz & Mentlik, LLP

(57) ABSTRACT

Belt assemblies comprising a flexible belt having a longitudinal axis and a plurality of substantially T-shaped plates, each of the substantially T-shaped plates including a substantially horizontal portion and a substantially vertical portion, the substantially vertical portion of each substantially T-shaped plate being fastened to the flexible belt are disclosed. The belt assemblies can be used for vertically suspending loads from the assemblies and transporting loads in a conveyor system.

50 Claims, 9 Drawing Sheets

SUSPENSION TRACK BELT

FIELD OF THE INVENTION

The present invention relates to a belt assembly. More particularly, the invention relates to a suspension track belt assembly for conveying articles vertically suspended from the belt assembly.

BACKGROUND OF THE INVENTION

Various systems exist for transporting multiple vertical loads through a workspace. For example, in food processing and garment processing facilities, conveying systems are used that include a plurality of hooks or other fixtures supported by a rail system. For garment conveying systems, the hooks or other fixtures support hangers or that carry clothes through the garment processing facility. For food processing systems, foodstuffs can be hung directly from the hooks supported by the rail. Examples of such conveying systems are disclosed in U.S. Pat. Nos. 6,244,425 and 3,010,584. In such conveying systems, because accurate positioning of the clothes or food items being transported by the conveying system is not critical, factors such as vibration of the conveying system and deviation of the position of the hangers from the vertical orientation are acceptable.

However, applications exists in which it would be desirable to provide conveying systems for transporting multiple work pieces over long distances through a work space such as a large factory with minimal deviation of the work piece from the vertical orientation and minimal vibration of the conveying system. It would also be desirable to provide a conveying system in which the assembly carrying the work pieces has a degree of flexibility that allows the assembly to transport the work pieces around corners and turns, yet also having sufficient rigidity to maintain a stable conveying system and accurate vertical positioning of the work pieces. It would also be desirable to provide an assembly for a conveying system that could be manufactured in long lengths, for example 2,000 meters and longer. It would be desirable to provide a belt assembly that can carry multiple loads vertically attached to the belt assembly that has the structural integrity to withstand such loads.

SUMMARY OF THE INVENTION

In accordance with one or more embodiments of the present invention, a belt assembly is provided comprising a flexible belt having a longitudinal axis and a plurality of substantially T-shaped plates, each of the substantially T-shaped plates including a substantially horizontal portion and a substantially vertical portion, the substantially vertical portion of each substantially T-shaped plate being fastened to the flexible belt, the belt assembly configured to support and transport a load suspended from the flexible belt in a conveyor system.

BREIF DESCRIPTION OF THE DRAWINGS

A more complete appreciation of the subject matter of the present invention and the various advantages thereof can be realized by reference to the following detailed description in which reference is made to the accompanying drawings in which.

DETAILED DESCRIPTION OF EXEMPLARY EMBODIMENTS

Before describing several exemplary embodiments of the invention, it is to be understood that the invention is not limited to the details of construction or process steps set forth in the following description. The invention is capable of other embodiments and of being practiced or carried out in various ways.

Figure 1:
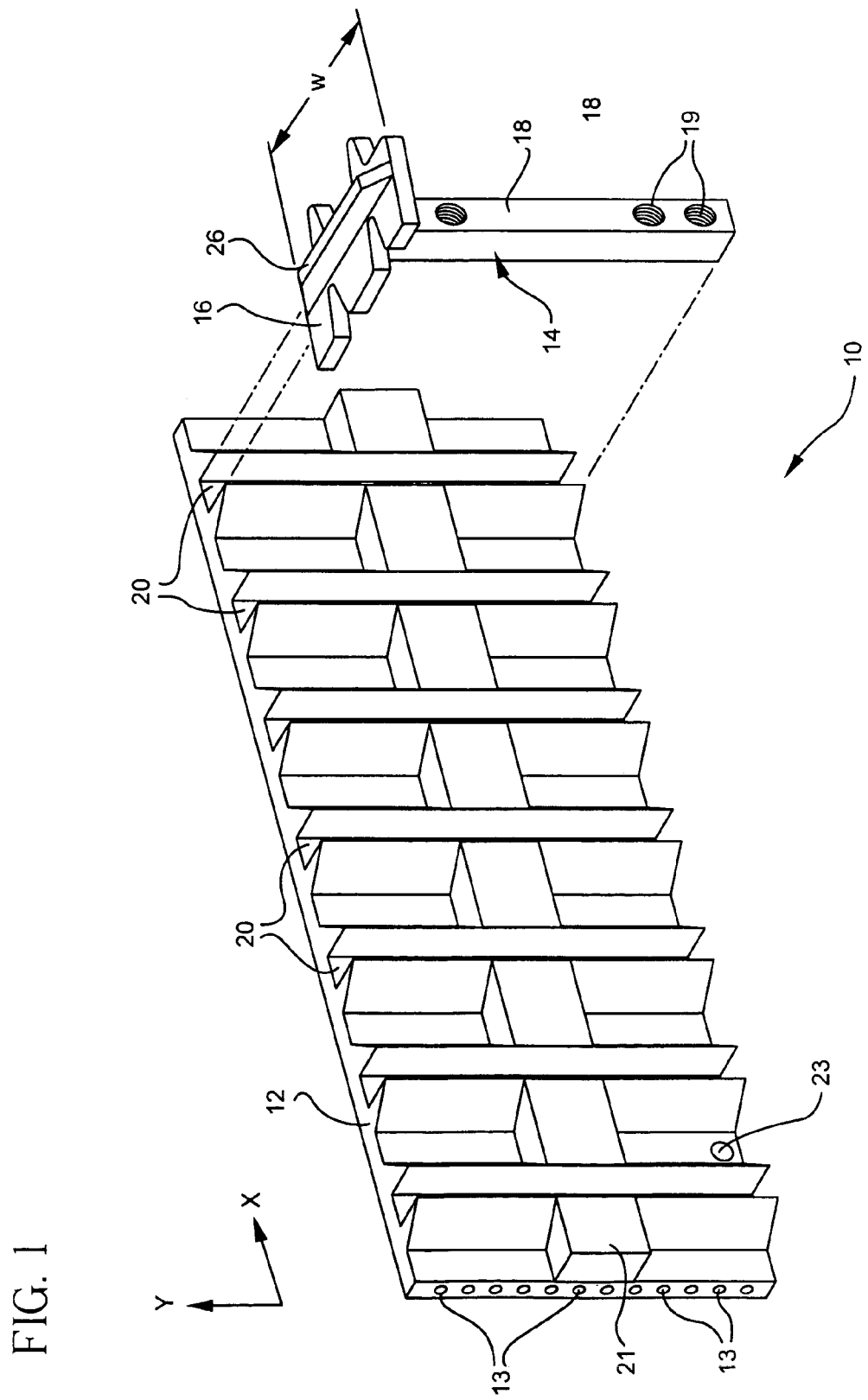
FIG. 1 is a disassembled perspective view of a belt assembly according to one embodiment of the invention.
Figure 2:
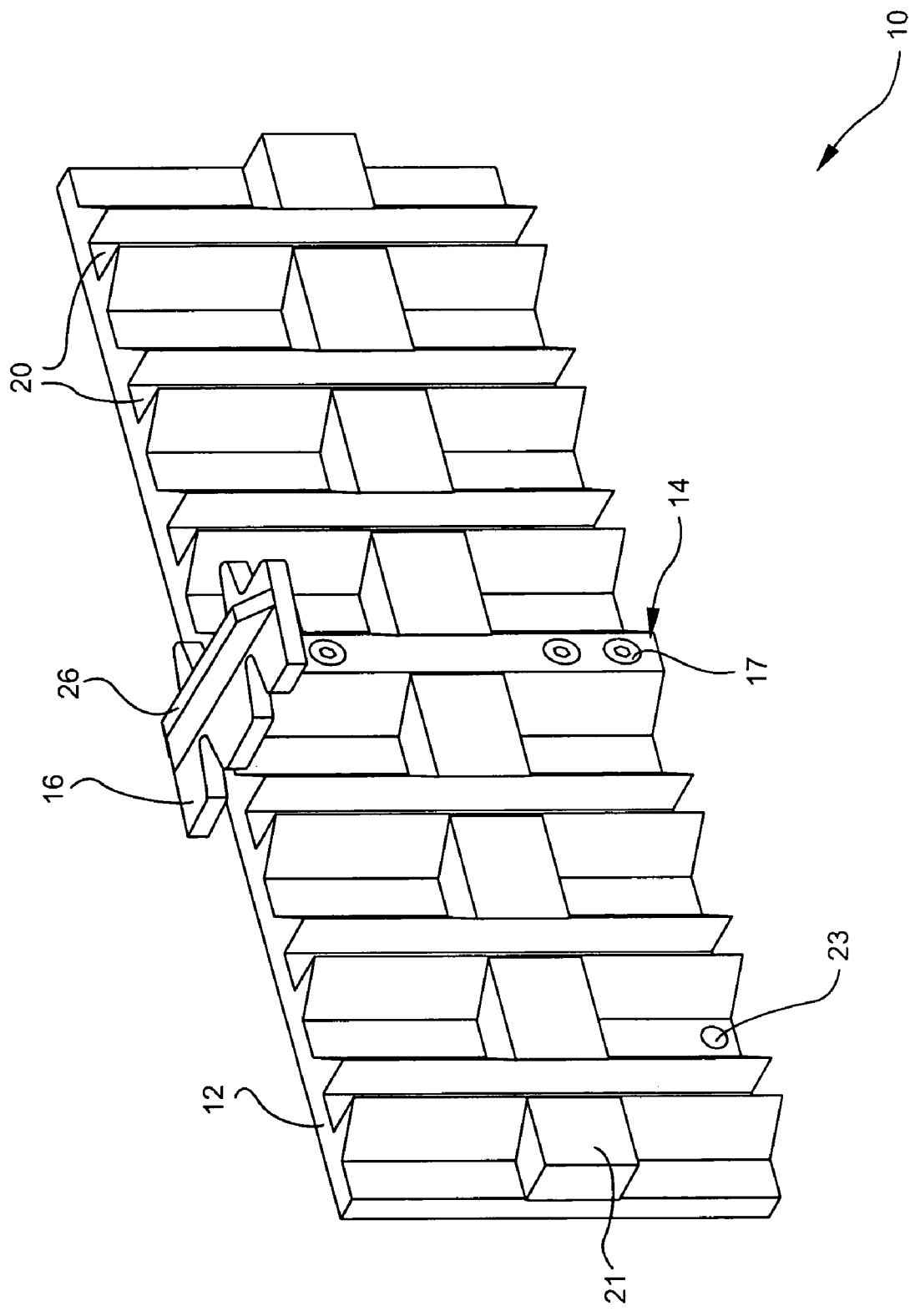
FIG. 2 is a partially assembled perspective view of a belt assembly according to one embodiment of the invention.
Figure 3:
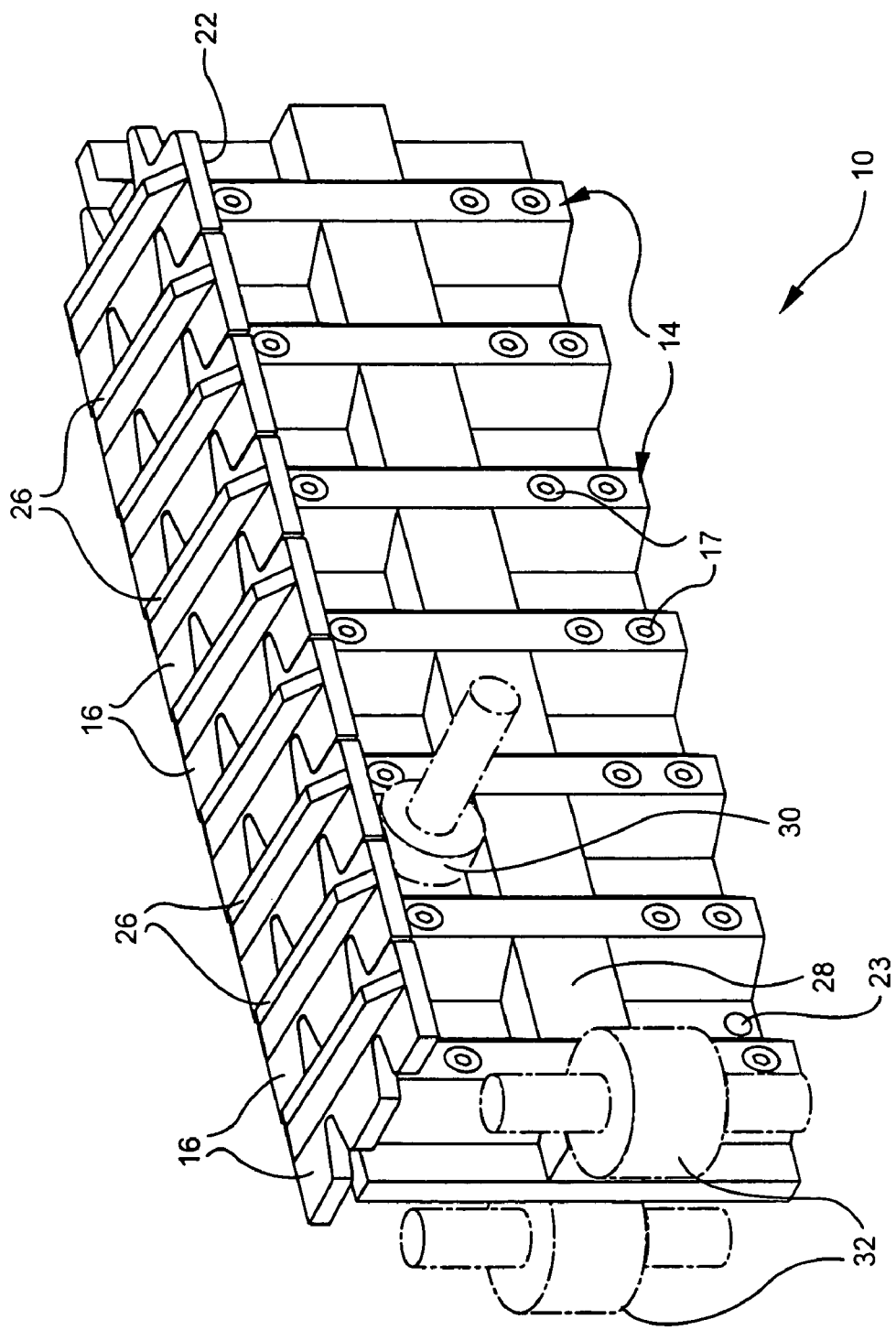
FIG. 3 is a fully assembled perspective view of a belt assembly according to one embodiment of the present invention.

Referring now to the Figures, and in particular FIGS. 1–3, a first embodiment of a belt assembly is shown, which comprises a flexible main body, which may be in the form of a belt 12 having a generally flat profile and a vertical axis Y and a longitudinal axis X. The belt assembly 10 further comprises a plurality of substantially T-shaped members or plates 14, each of the substantially T-shaped members or plates 14 including a substantially horizontal portion 16 and a substantially vertical portion 18. The substantially vertical portion 18 of each substantially T-shaped member or plate 14 is fastened to the flexible belt 12. The belt assembly 10 is configured to support and transport a load suspended from the flexible belt in a conveyor system.

The belt 12 has at least one opening 15 extending through the belt configured to receive a fastener 17, such as a bolt or a screw. It will be understood that other types of fasteners can be utilized in accordance with one or more embodiments of the present invention. In one or more embodiments, the substantially vertical portions 18 include at least one hole 19 therethrough configured to receive the fastener 17. When the T-shaped members 14 and the belt 12 are fastened to together, the holes 19 in the substantially T-shaped members 14 and the openings 15 in the belt 12 are substantially aligned. In preferred embodiments, the holes in each vertical channel are aligned along the vertical axis of the belt, and holes in adjacent channels are aligned along the longitudinal axis. As shown in FIGS. 2 and 3, each of the substantially T-shaped members or plates 14 are fastened to the belt 12 by a fastener 17 extending through the holes 19 in substantially T-shaped members 14 and the openings 15 in the belt 12.

According to one or more embodiments of the invention, the main body or belt 10 includes a plurality of substantially vertical channels 20 substantially transverse to the longitudinal axis X of the belt or main body 12. The channels are separated by walls that are shown in the Figures as having a triangular cross-section, however, it will be understood that the walls defining the channels can also be rectangular in cross section. The substantially vertical portion 18 of each substantially T-shaped plate is configured to be seated in one of the substantially vertical channels, as shown in FIGS. 1–3. As shown in FIGS. 2 and 3, each substantially vertical channel 20 of the main body or belt 12 has a substantially T-shaped plate 14 seated therein and fastened to the belt or main body 12.

According to one or more embodiments, the flexible belt or main body 12 includes a polymeric belt. Preferably, the belt or main body 12 includes a plurality of wires 13 running longitudinally through the interior of the belt to provide strength to the main body 12. Such belt constructions having longitudinally extending wires embedded in a polymeric belt are known in the art.

According to one or more embodiments, the T-shaped members or plates 14 are made from a material different than the belt material. Preferably, the substantially T-shaped plates are made from a rigid material, such as metal or fiber reinforced polyurethane. The T-shaped members 14 may be of unitary construction, or the horizontal and vertical portions may be separate units that are fastened together.

Figure 4:
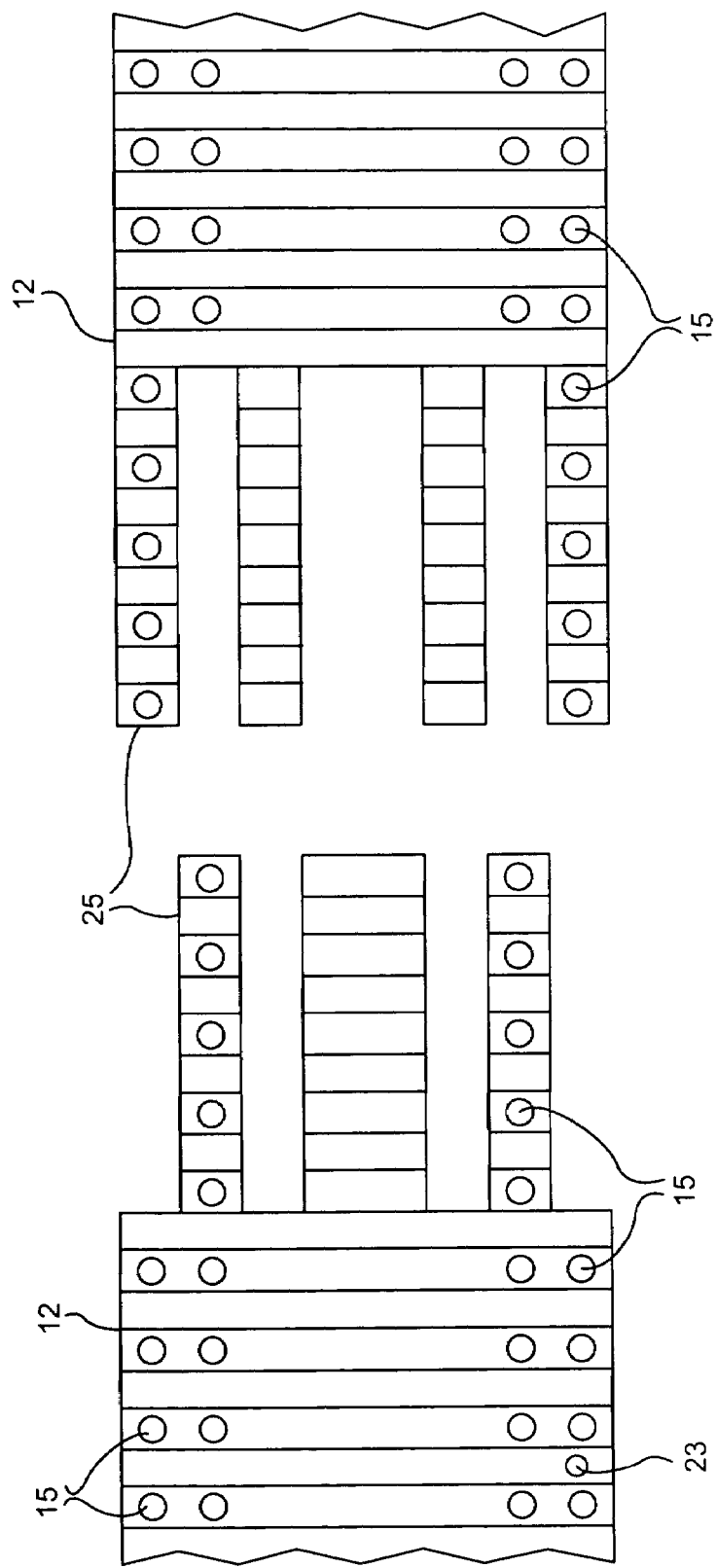
FIG. 4 is a plan view of a pair of belt-connecting sections according to one embodiment of the invention.
Figure 5:
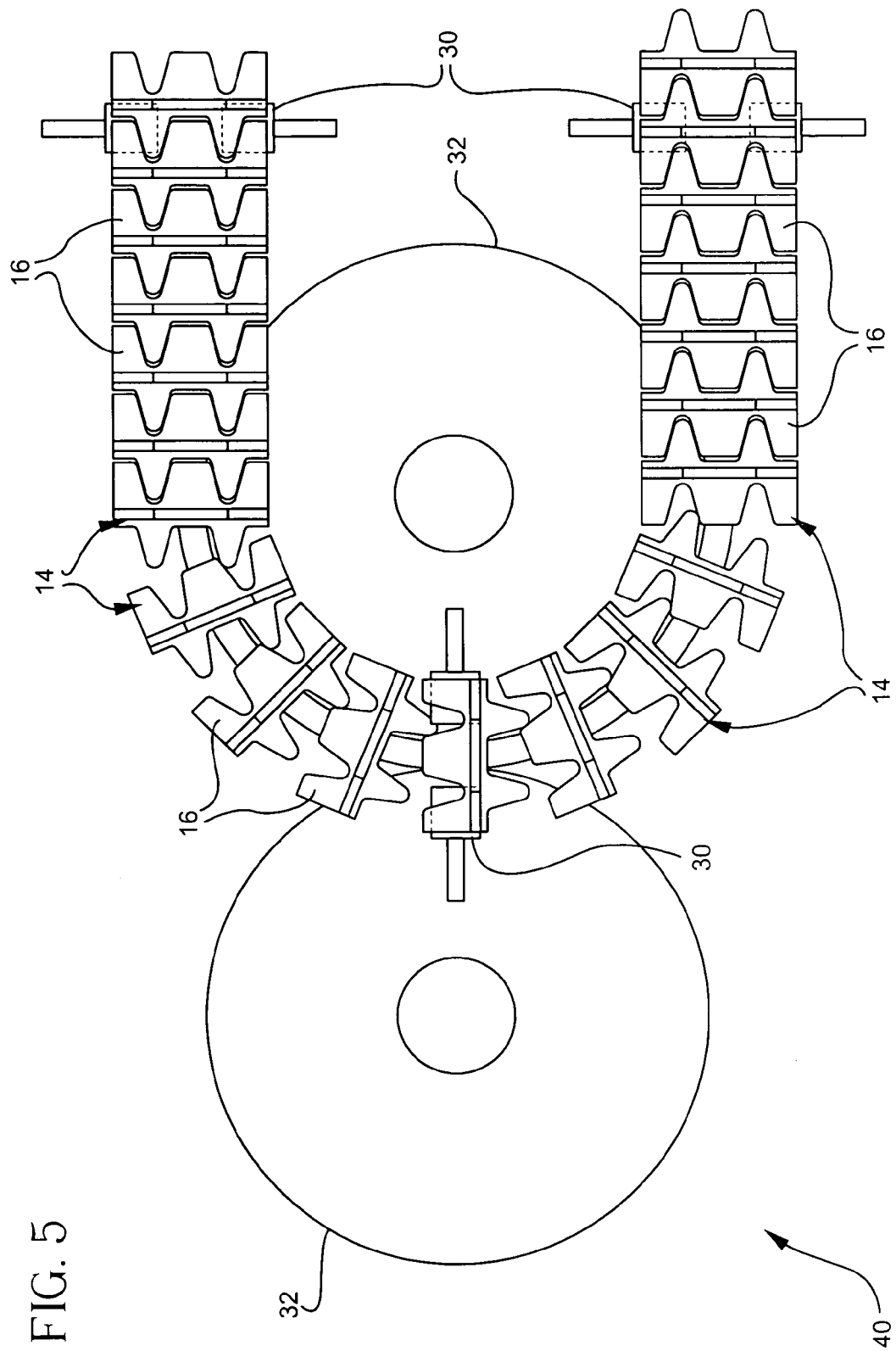
FIG. 5 is a top plan view of plurality of belt assemblies in conveyor system according to one embodiment of the invention.

The belt 12 can be provided in a variety of lengths, depending on the particular application. For ease of assembly and flexibility in providing a virtually infinite variety of belt lengths, the belts 12 may be finger jointed as shown in FIG. 4 so that a plurality of belts can be joined end to end. Each belt 12 thus has a plurality of fingers 25 adapted to be joined with the end of a second belt with complementary interlocking fingers 25. As shown in FIG. 4, the fingers on the alternating belt sections are staggered so that they interlock. Other configurations are possible. When T-shaped members are fasted to the finger-jointed sections at the ends of the belts, the two belts are rigidly fastened together. While not intended to be limiting, the individual belt sections 12 can be about 10 meters in length, and it is envisioned that any number of sections can be joined together to form a conveyor system up to, but not limited to, 2000 meters in length that can extend through a manufacturing facility for transporting workpieces through the facility. The substantially horizontal portions 16 of the T-shaped members 14 are configured to suspend the belt assembly 10 and provide a running surface 22 that cooperates with support rollers 30, permitting movement of the belt assembly 10 through a conveyor system 40 as shown in FIG. 5. The substantially horizontal portion 16 of each T-shaped member or plate 14 includes a reinforcement rib 26. The reinforcement rib 26 extends across width "W" of the horizontal portion 16 of each T-shaped member 14, which provides added strength to the horizontal member to support vertical loads from the belt assembly 10.

According to one or more embodiments, at least a portion of the substantially vertical portions provide a drive surface 28 for engagement with a drive element such as a drive roller 32 to move the belt assembly through the conveyor system. In the embodiment shown in FIGS. 1–3, the belt includes a longitudinally extending protrusion or centrally raised portion 21 that cooperates with the vertical portions to provide a drive surface 28. The driving surface may be located centrally along the vertical axis Y of the assembly. The belt 12 may also include at least one sensor opening 23 to allow a sensor to monitor the position of the belt assembly in the conveyor system.

In one or more embodiments, the belt assembly 10 is constructed in a manner such that there is minimal deflection of the substantially vertical portion 18 from the vertical axis Y when the belt is utilized in a conveyor system. In such embodiments, preferably the maximum deviation of the substantially vertical portion from the vertical axis Y when the belt is in use is less than about 5 degrees. More preferably, the maximum deviation of the vertical portion from the vertical axis Y when the belt is in use is less than about 1 degree. It will be understood that this deviation will depend on a variety of factors, including one or more of the following factors, including but not limited to the material used to form the T-section, the material used to form the belt, and the dimensions of the belt and T-sections.

Figure 7:
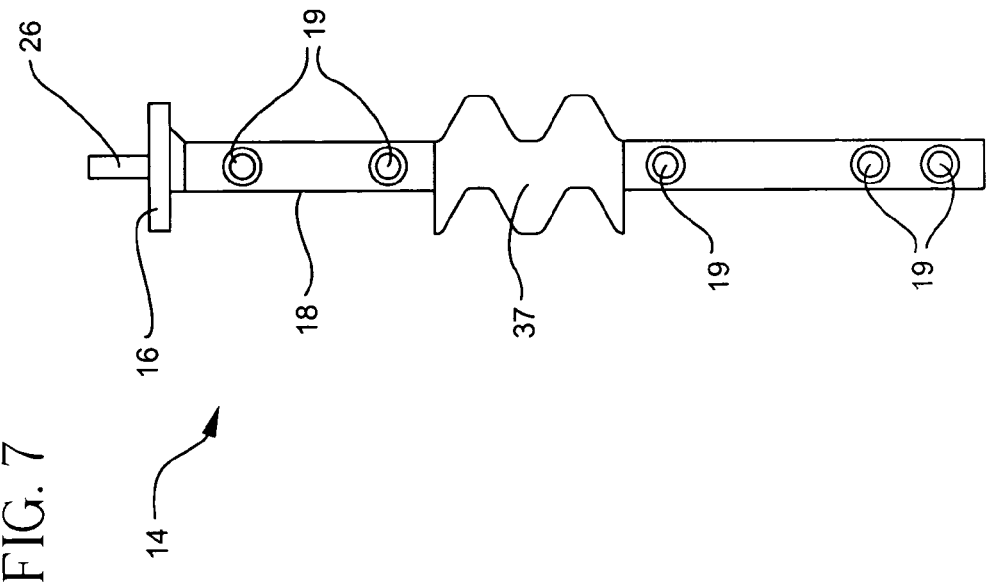
FIG. 7 is a side view of a T-shaped plate used in a belt assembly according to one or more embodiments.
Figure 6:
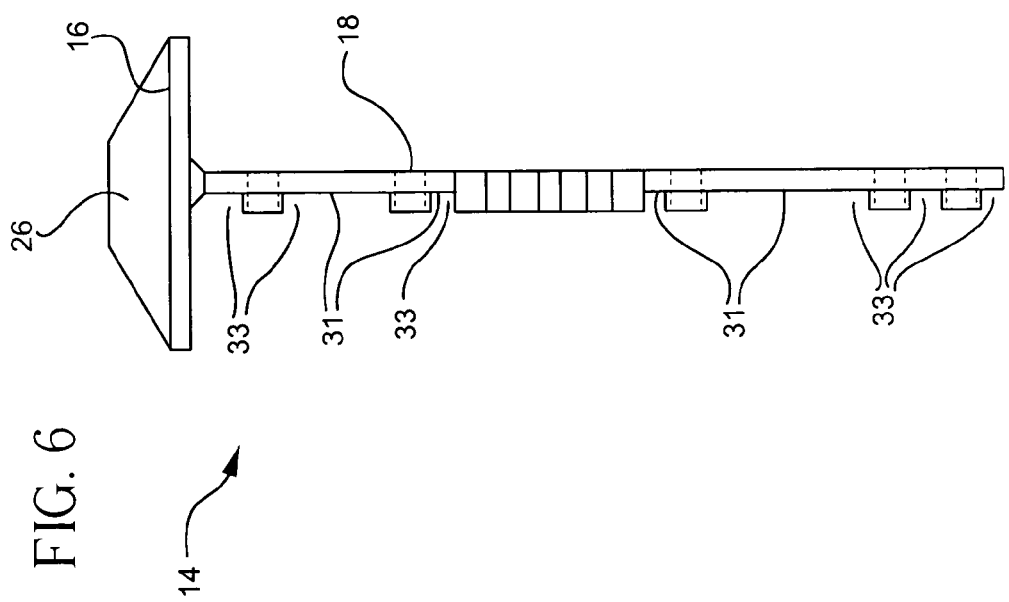
FIG. 6 is a front end view of a T-shaped plate used in a belt assembly according to one or more embodiments.

FIGS. 6–10 show an alternative embodiment of according to one or more embodiments of the present invention. In the embodiments shown in FIGS. 6–10 like elements will be denoted by the same reference numerals as in the previously described embodiments in FIGS. 1–5. FIG. 6 shows an end view of a T-shaped member 14, having a horizontal portion 16 and a vertical portion 18. As in the previously described embodiment, the T-shaped member 14 includes a reinforcement rib 26 associated with the horizontal portion 16 of the T-shaped member 14 to provide increased flexural strength to the horizontal portion 16 when the belt assembly supports a vertical load suspended from the assembly. FIG. 7 shows a side view of a T-shaped member 14, and the vertical portion 18 of the T-shaped member includes holes 19 therethrough to receive fasteners.

Figure 8:
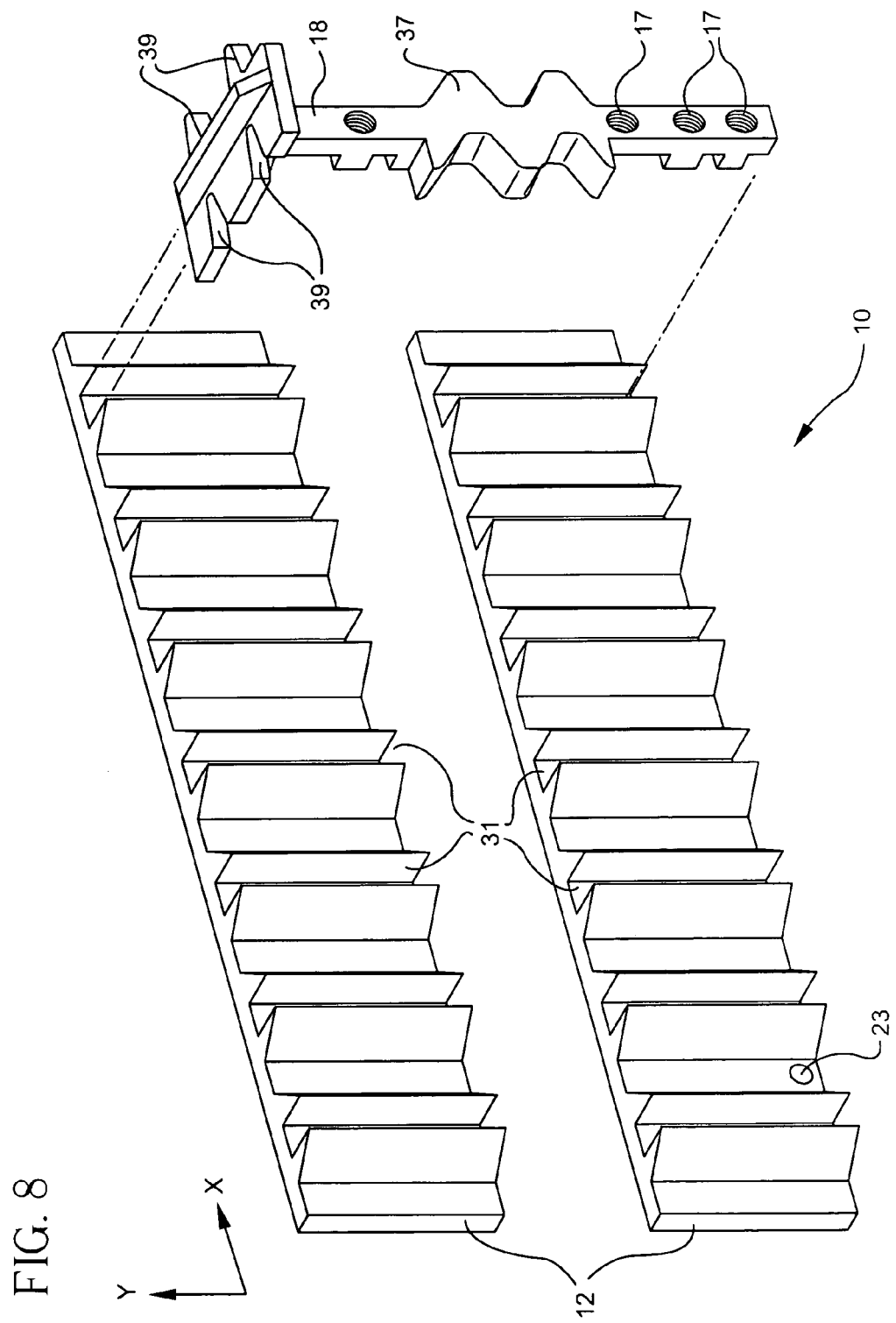
FIG. 8 is a partially assembled perspective view of a belt assembly according to one embodiment of the invention.
Figure 9:
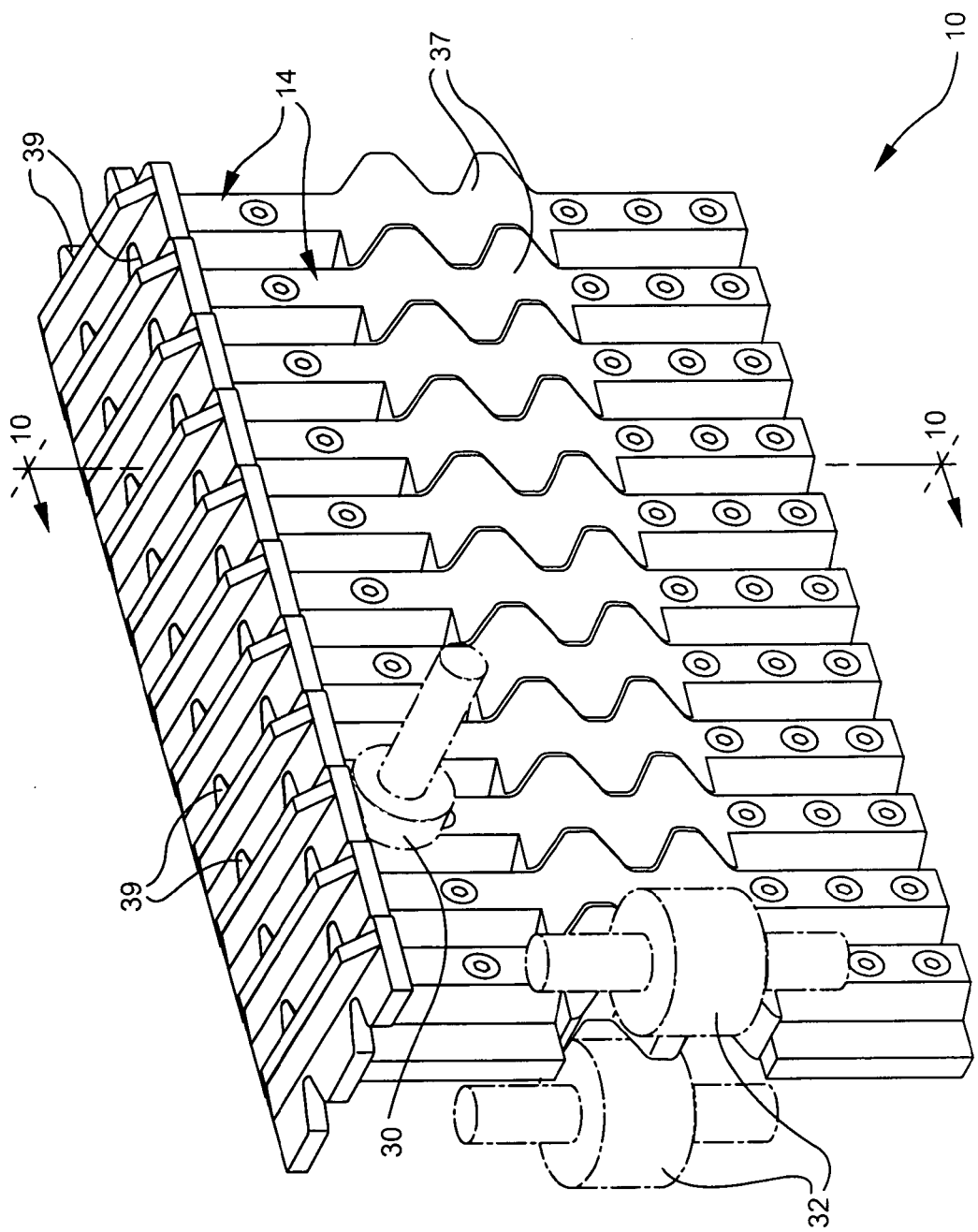
FIG. 9 is a fully assembled perspective view of a belt assembly according to one embodiment of the present invention.

With reference to FIGS. 8 and 9, a belt assembly 10 is shown according to a second embodiment of the invention. In the embodiment shown in FIG. 8, the main body of the belt assembly 10 includes a pair of belts 12 arranged in a substantially parallel relationship secured together by the T-shaped members 14. A central portion of the vertical portion 18 of the T-shaped member 14 includes an interlocking structure 37. Preferably, the horizontal portion 16 of the T-shaped member 14 includes a profiled surface 39 that interlock with each other. When a plurality of the T-shaped members 14 are fasted to the belts 12, the interlocking structure 37 of the vertical portion 18 of each T-shaped member 14 engages the complementary interlocking structure 37 on adjacent T-shaped members 12, as best shown in FIG. 9. Similarly, the profiled surface 39 on each of the horizontal portions 16 interlocks with adjacent profiled surfaces 39 on adjacent horizontal portions 16 of the T-shaped members 14.

Figure 10:
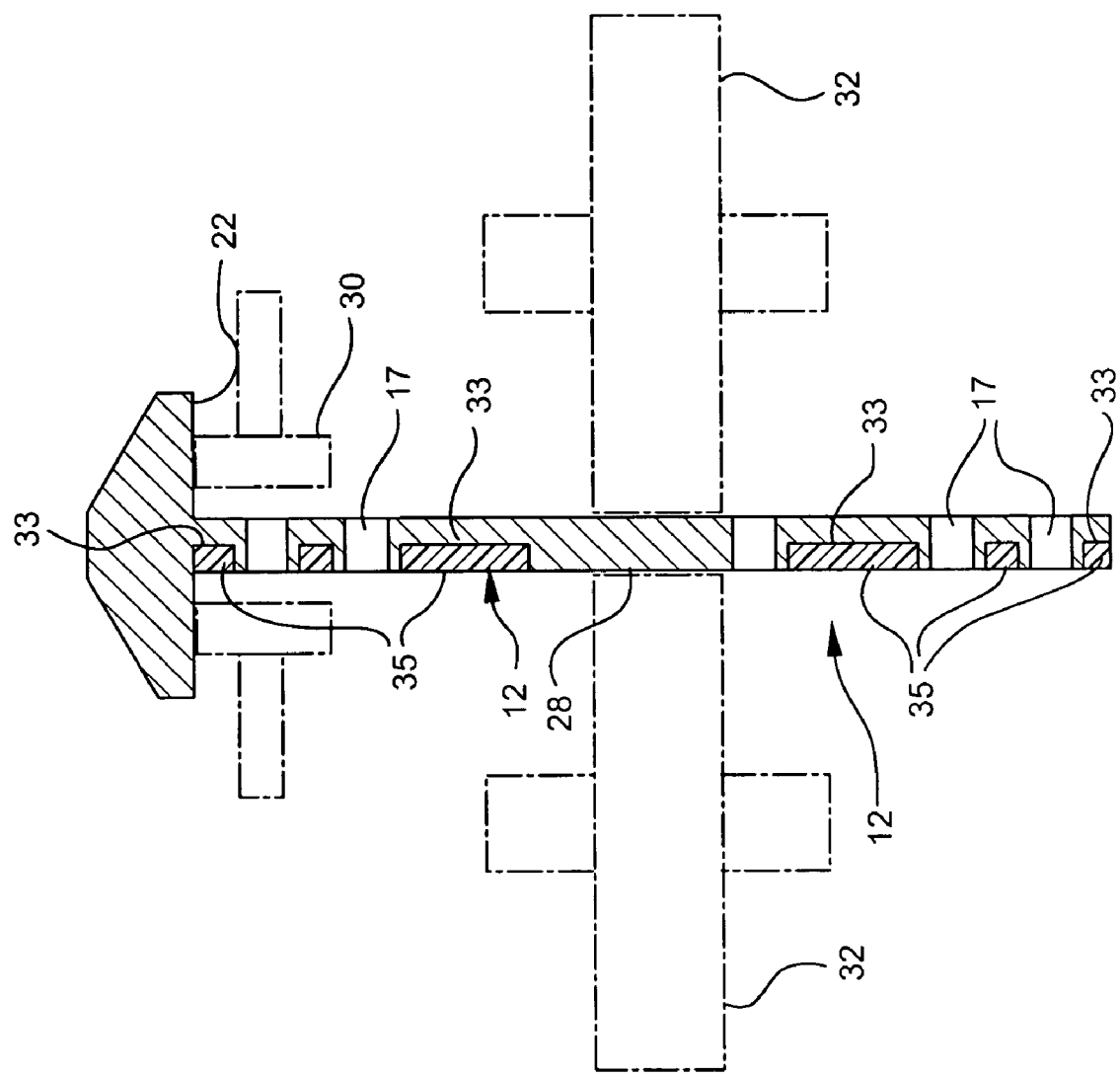
FIG. 10 is a cross-sectional view taken along 10—10 of FIG. 9.

As shown in FIGS. 9 and 10, the interlocking structure 37 of the T-shaped members 14 provides a continuous driving surface 28 for engagement with a pair of driving elements such as a pair of drive rollers 32. The pair of drive rollers 32 engages the driving surface 28, and as the drive rollers 32 rotate, the belt assembly is driven through a conveyor system by frictional engagement of the drive rollers 32 and the driving surface 28. It will be understood that the number of roller pairs used to drive the belt assembly in a conveyor system will depend on the the length of the belt assembly and the weight of the load being moved through the conveyor system.

The interlocking profiled surfaces 39 of the horizontal portions 16 provide a continuous running surface 22 for support members 30 such as a pair of support rollers. A plurality of support members 30 can be distributed throughout a conveyor system and spaced in a manner to support the belt assembly and vertical loads suspended from the belt assembly as part of a conveyor system.

Referring to FIGS. 6 and 10, the vertical portion 18 the T-shaped members 14 has an interior, belt contacting surface 31 including at least one depression 33 on the interior, belt-contacting surface 31. Preferably, the vertical portion 18 of the T-shaped member 14 has a plurality of depressions 33 on the interior, belt-contacting surface 31 of each of the T-shaped members. The depressions 31 cooperate with protrusions on the belts 12, and the protrusions 35 on the belts engage the depressions 33 on the T-shaped members to aid in securing the belts 12 to the T-shaped members. Fasteners inserted through the openings 15 in the belt and the holes 19 in the vertical portions 18 of the T-shaped members 14 secure the T-shaped members 14 to the belts 12. As in the embodiment described in FIG. 5, belts can 12 be joined together in the longitudinal direction "X" by finger jointing belts together lengthwise to provide any length belt assembly desired for a particular application.

Although the invention herein has been described with reference to particular embodiments, it is to be understood that these embodiments are merely illustrative of the principles and applications of the present invention. For example, a wide variety of belt profiles and configurations can be provided in addition to the profiles described herein. It is therefore to be understood that numerous modifications may be made to the illustrative embodiments and that other arrangements may be devised without departing from the spirit and scope of the present invention as defined by the appended claims and their equivalents.

What is claimed is:

1. A belt assembly comprising:
a flexible belt having a longitudinal axis and including a plurality of substantially vertical channels substantially transverse to said longitudinal axis; and
a plurality of substantially T-shaped plates, each of the substantially T-shaped plates including a substantially horizontal portion and a substantially vertical portion, said substantially vertical portion of each substantially T-shaped plate being configured to be seated in one of said plurality of substantially vertical channels, each of said plurality of substantially vertical channels having a substantially T-shaped plate seated therein and fastened to said belt, the belt assembly configured to support and transport a load suspended from the flexible belt in a conveyor system.

2. The assembly of claim 1, wherein the substantially horizontal portions are configured to suspend the belt assembly and provide a running surface that cooperates with a roller permitting movement of the belt assembly through the conveyor system.

3. The assembly of claim 2, wherein the substantially T-shaped plates are made from a material different than the belt.

4. The assembly of claim 3, wherein the substantially T-shaped plates are made from a rigid material.

5. The assembly of claim 4, wherein the substantially horizontal portion of each T-shaped plate includes a reinforcement rib.

6. The assembly of claim 1, wherein the flexible belt is a polymeric belt.

7. The assembly of claim 6, wherein the belt includes a plurality of wires running longitudinally through the belt.

8. The assembly of claim 1, wherein at least a portion of the substantially vertical portions provide a drive surface for driving the belt assembly through the conveyor system.

9. The assembly of claim 1, wherein the belt has at least one opening extending through the belt configured to receive a fastener.

10. The assembly of claim 9, wherein the substantially vertical portions include at least one hole there through configured to receive a fastener.

11. The assembly of claim 10, wherein each of the substantially T-shaped plates are fastened to the belt by a fastener extending through the substantially T-shaped plate and the belt.

12. The assembly of claim 1, wherein the belt assembly includes a pair of flexible belts fastened together by the substantially T-shaped plates.

13. The assembly of claim 12, wherein each of the pair of belts is substantially the same, the belts are arranged in a substantially parallel arrangement, and the substantially vertical channels in each belt are aligned.

14. The belt assembly of claim 13, wherein a portion of the vertical portion of the substantially T-shaped plate provides a driving surface for a drive element.

15. The belt assembly of claim 14, wherein the driving surface is located centrally along the vertical axis.

16. The belt assembly of claim 15, wherein the driving surface includes an interlocking structure.

17. The belt assembly of claim 15, wherein the interlocking structure of adjacent substantially T-shaped plates provide a continuous driving surface for a drive element.

18. The assembly of claim 1, wherein the belt includes at least one sensor opening.

19. The belt assembly of claim 1, wherein the assembly includes a vertical axis and horizontal axis, and the assembly is constructed in a manner such that there is minimal deflection of the substantially vertical portion from the vertical axis when the belt is utilized in a conveyor system.

20. The belt of assembly of claim 19, wherein the maximum deviation of the substantially vertical portion from the vertical axis is less than about 5 degrees.

21. The belt assembly of claim 1, wherein the horizontal portion of the substantially T-shaped plate includes a reinforcement rib extending between the ends of the horizontal portion.

22. The belt assembly of claim 1, wherein the horizontal portions adjacent substantially T-shaped plates interlock.

23. The belt assembly of claim 1, wherein the belt includes a central raised portion, and the central raised portion of the belt and a portion of the vertical portions of the substantially T-shaped plates provide a driving surface for a drive element.

24. A belt assembly, comprising:
a flexible main body having a generally flat profile and a vertical axis;
a plurality of substantially T-shaped members attached to the main body to provide a belt assembly having a substantially vertical portion and a substantially horizontal portion, wherein the substantially horizontal portion is configured to support the belt assembly when the belt is suspended in a conveyor assembly.

25. The belt assembly of claim 24, wherein the main body includes a belt.

26. The belt assembly of claim 25, wherein the main body includes a pair of belts in a substantially parallel relationship secured together by the T-shaped members.

27. The belt assembly of claim 26, wherein adjacent T-shaped members interlock with each other.

28. The belt assembly of claim 27, wherein the horizontal portions of the substantially T-shaped members interlock with each other.

29. The belt assembly of claim 28, wherein the vertical portions of the substantially T-shaped members interlock with each other.

30. The belt assembly of claim 29, wherein the belt assembly is configured to support a vertical load supported from the assembly.

31. The belt assembly of claim 27, wherein the vertical portions of the substantially T-shaped members interlock with each other.

32. The belt assembly of claim 31, wherein the T-shaped members are made from a rigid material.

33. The belt assembly of claim 26, wherein the vertical portion of each T-shaped members includes an interior, belt-contacting surface having at least one depression and each belt includes at least one protrusion configured to engage the depression.

34. The belt assembly of claim 33, wherein the belt-contacting surface of each T-shaped member has a plurality of depressions configured to engage a plurality of protrusions on each belt.

35. The belt assembly of claim 34, wherein the T-shaped members interlock with each other.

36. The belt assembly of claim 35, wherein the horizontal portion and the vertical portion of each T-shaped member include interlocking structure that interlocks with adjacent T-shaped members.

37. The belt assembly of claim 25, wherein the belt includes a sensor opening to provide a positional reference point on the belt.

38. The belt assembly of claim 25, wherein the vertical portion of the T-shaped members includes an interior, belt-contacting surface having at least one depression and the belt includes at least one protrusion configured to engage the depression.

39. The belt assembly of claim 38, wherein the belt-contacting surface of the T-shaped member has a plurality of depressions configured to engage a plurality of protrusions on the belt.

40. The belt assembly of claim 24, wherein a portion of the T-shaped members provide a driving surface for engagement with at least a pair of drive members.

41. The belt assembly of claim 40, wherein the maximum deviation of the substantially vertical portion from the vertical axis is less than about 1 degree.

42. The belt assembly of claim 40, wherein each of the T-shaped members includes a rib member on the substantially horizontal portion each T-shaped member.

43. A belt assembly comprising:
a pair of flexible belts having a longitudinal axis; and
a plurality of substantially T-shaped plates, each of said substantially T-shaped plates including a substantially horizontal portion and a substantially vertical portion, the substantially vertical portion of each substantially T-shaped plate being fastened to said pair of flexible belts, said belt assembly configured to support and transfer a load suspended from said flexible belt in a conveyor system.

44. The assembly of claim 43 wherein said flexible belt includes a plurality of substantially vertical channels substantially transverse to said longitudinal axis, each of said pair of flexible belts being substantially the same, said pair of flexible belts being arranged in a substantially parallel arrangement, and said plurality of vertical channels in each of said pair of belts being aligned.

45. The assembly of claim 43 wherein a portion of said substantially vertical portion of said substantially T-shaped plates provides a driving surface for a drive element.

46. The assembly of claim 45 wherein said driving surface is located centrally along said vertical axis.

47. The assembly of claim 46 wherein said driving surface includes an interlocking structure.

48. The assembly of claim 47 wherein said interlocking structure of adjacent substantially T-shaped plates provides a continuous driving surface for a drive element.

49. A belt assembly comprising:
a flexible belt having a longitudinal axis; and
a plurality of substantially T-shaped plates, each of said plurality of substantially T-shaped plates including a substantially horizontal portion and a substantially vertical portion, said substantially vertical portion of each substantially T-shaped plate being fastened to said flexible belt, said belt assembly configured to support and transport a load suspended from said flexible belt in a conveyor system;
said flexible belt including at least one sensor opening.

50. A belt assembly comprising:
a flexible belt having a longitudinal axis and including a central raised portion; and
a plurality of substantially T-shaped plates, each of said plurality of substantially T-shaped plates including a substantially horizontal portion and a substantially vertical portion, said substantially vertical portion of each substantially T-shaped plate being fastened to said flexible belt, said central raised portion of said flexible belt and a portion of said vertical portions of said substantially T-shaped plates providing a driving force for a drive element, said belt assembly configured to support and transport a load suspended from said flexible belt in a conveyor system.

* * * * *

UNITED STATES PATENT AND TRADEMARK OFFICE
CERTIFICATE OF CORRECTION

| | | |
|---|---|---|
| PATENT NO. | : 7,051,870 B2 | Page 1 of 1 |
| APPLICATION NO. | : 10/722775 | |
| DATED | : May 30, 2006 | |
| INVENTOR(S) | : Rudolph Schoendienst, Willi Fuellemann and Jeffrey C. Hudgens | |

It is certified that error appears in the above-identified patent and that said Letters Patent is hereby corrected as shown below:

On the title page, item: (73) Assignee: insert --BrecoFlex Co., L.L.C. Eatontown, NJ (US)--.

Signed and Sealed this

Twenty-second Day of May, 2007

JON W. DUDAS
*Director of the United States Patent and Trademark Office*